United States Patent [19]
Takemoto et al.

[11] Patent Number: 5,485,534
[45] Date of Patent: *Jan. 16, 1996

[54] METHOD AND APPARATUS FOR EMPHASIZING SHARPNESS OF IMAGE BY DETECTING THE EDGE PORTIONS OF THE IMAGE

[75] Inventors: Fumito Takemoto; Osamu Shimazaki, both of Kaisei, Japan

[73] Assignee: Fuji Photo Film Co., Ltd., Kanagawa, Japan

[*] Notice: The term of this patent subsequent to pending has been disclaimed.

[21] Appl. No.: 81,153

[22] Filed: Jun. 25, 1993

Related U.S. Application Data

[62] Division of Ser. No. 864,382, Apr. 6, 1992, which is a continuation of Ser. No. 674,985, Mar. 26, 1991, abandoned.

[30] Foreign Application Priority Data

Mar. 28, 1990 [JP] Japan ........................ 2-79664

[51] Int. Cl.$^6$ .................................................. G06K 9/36
[52] U.S. Cl. .................................................. 382/263; 382/266
[58] Field of Search ........................ 382/22, 54, 263, 382/264, 266, 275; 358/37, 166, 447, 463; 348/252; H04N 1/40

[56] References Cited

U.S. PATENT DOCUMENTS

| | | | |
|---|---|---|---|
| 4,335,407 | 6/1982 | Atoji et al. | 358/284 |
| 4,553,260 | 11/1985 | Belt et al. | 382/22 |
| 4,591,923 | 5/1986 | Urabe et al. | 358/284 |
| 4,672,463 | 6/1987 | Tomohisa et al. | 358/284 |
| 4,739,395 | 4/1988 | Johanndeiter et al. | 358/37 |
| 4,747,052 | 5/1988 | Hishinuma et al. | 364/414 |
| 4,783,833 | 11/1988 | Kawabata et al. | 382/22 |
| 4,785,347 | 11/1988 | Ezuka et al. | 358/75 |
| 4,817,174 | 3/1989 | Nakatani | 382/22 |
| 4,860,118 | 8/1989 | Arimoto | 358/451 |
| 4,972,256 | 11/1990 | Hirosawa et al. | 358/80 |
| 5,051,842 | 9/1991 | Shimazaki | 358/447 |
| 5,051,902 | 9/1991 | Hishinuma | 364/413.13 |
| 5,111,285 | 5/1992 | Fujita et al. | 358/75 |
| 5,134,667 | 7/1992 | Suzuki | 382/22 |

FOREIGN PATENT DOCUMENTS 0054570   3/1985   Japan ........................ 358/447

*Primary Examiner*—Leo H. Boudreau
*Assistant Examiner*—Andrew W. Johns
*Attorney, Agent, or Firm*—Sughrue, Mion, Zinn, Macpeak & Seas

[57] ABSTRACT

According to this invention, a sharpness emphasis is carried out by multiplying a sharpness emphasis signal of an original image by a function of a look-up table which is accessed based on an output from an edge detecting filter performing detections, in accordance with only the edge portions of the original image. Since the edge detecting filter for detecting edges of the image is equipped in order to emphasize the sharpness only in the edge portions of the image, it is possible to prevent the image grains from being sharpness-emphasized. In addition, although the edge detecting filter may have a same size of a mask with that of the unsharpness mask, it is possible, if required, to modify freely both sizes of the masks, in order to perform a proper process in accordance with each image variation.

7 Claims, 4 Drawing Sheets

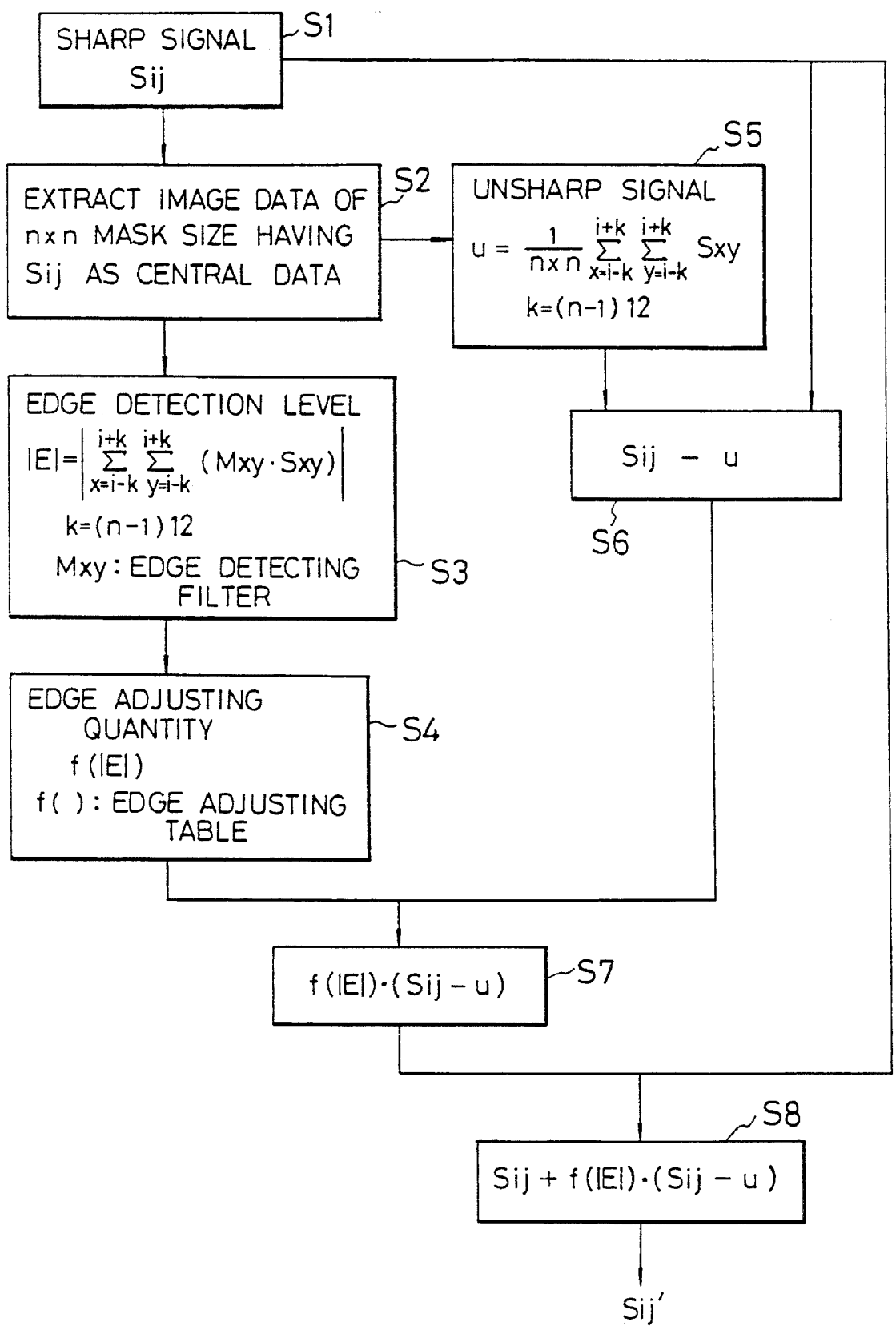
F I G .1

$$M_1 = \begin{vmatrix} -1 & 0 & 0 & 0 & 1 \\ -1 & 0 & 0 & 0 & 1 \\ -1 & 0 & 0 & 0 & 1 \\ -1 & 0 & 0 & 0 & 1 \\ -1 & 0 & 0 & 0 & 1 \end{vmatrix}$$

$$M_2 = \begin{vmatrix} -1 & -1 & -1 & -1 & -1 \\ 0 & 0 & 0 & 0 & 0 \\ 0 & 0 & 0 & 0 & 0 \\ 0 & 0 & 0 & 0 & 0 \\ 1 & 1 & 1 & 1 & 1 \end{vmatrix}$$

$$\begin{vmatrix} 1 & 1 & 0 & -1 & -1 \\ 1 & 1 & 0 & -1 & -1 \\ 1 & 1 & 0 & -1 & -1 \\ 1 & 1 & 0 & -1 & -1 \\ 1 & 1 & 0 & -1 & -1 \end{vmatrix} \qquad \begin{vmatrix} 1 & 0.5 & 0 & -0.5 & -1 \\ 1 & 0.5 & 0 & -0.5 & -1 \\ 1 & 0.5 & 0 & -0.5 & -1 \\ 1 & 0.5 & 0 & -0.5 & -1 \\ 1 & 0.5 & 0 & -0.5 & -1 \end{vmatrix}$$

METHOD AND APPARATUS FOR EMPHASIZING SHARPNESS OF IMAGE BY DETECTING THE EDGE PORTIONS OF THE IMAGE

This is a divisional of application Ser. No. 07/864,382, which is a continuation of 07/674,985 filed Mar. 26, 1991, now abandoned.

BACKGROUND OF THE INVENTION

This invention relates to a method and apparatus for emphasizing sharpness of an image to be used for a color scanner for mask-making, a laser color printer, a facsimile or the like.

In the prior art image scanning recording apparatus, such as a color scanner, there has been employed an electrooptical unsharpness (differential) masking method, an electrical crisping or a peaking method in order to improve the sharpness of an image. These methods are effective to improve the sharpness and reproduce a recorded image sharply, however, at the same time, since the improvement of the sharpness is effected uniformly over the whole area of an original image, the grain clusters of the original film are disadvantageously emphasized also in an area having a flat tone on the original. As a result, a poor quality of the recording image having uneven, rough graininess occurs.

In order to solve the problem described above, there has been introduced a method for emphasizing sharpness emphasis disclosed in Japanese Patent Application Laid-open No. 146451/1980. In this method, a sharpness signal is formed based on a main signal obtained from a photoelectrically scanned original, or based on the main signal, and an unsharp signal which includes the information on the peripheral area of the scanned area corresponding to the main signal. This sharpness emphasis signal corrects or modifies the main signal so as to emphasize the image to be recorded. When this process is carried out, the variation level of the unsharp signal is measured or distinguished so that the quantity of the sharpness emphasis signal can be controlled on the basis of the measured variation level. In this method, no reference was made to the method of the auxiliary scanning, however, and the sharpness emphasis is carried out in accordance with only the main scanning. The lack of auxiliary scanning disadvantageously causes the deterioration of the image quality. In addition, since the unsharp signal used for the sharpness emphasis and another unsharp signal to distinguish an edge are respectively formed of the same masks having a fixed size, the above method exhibits a weakness in dealing with the image variation requirements, such as a screen line number, edge width or the like.

On the other hand, other methods for emphasizing sharpness do not have such defects as described above such methods are disclosed by the present application in Japanese Patent Application Laid-open No. 3269/1985 and Japanese Patent Application Laid-open No. 54570/1985. However, since it is impossible for the methods to distinguish between the grain (coupler) and the edge (film; especially a reversal film), the sharpness in the flat area of the image is likely to be emphasized, which consequently leads to an unevenness of the image quality.

SUMMARY OF THE INVENTION

This invention has been achieved in consideration of the above discussed circumstances and an object of the present invention is to provide a method and its apparatus by which a sharpness emphasis can be sufficiently effected in proper manner without emphasizing the graininess of grains on the original image.

According to one aspect of this invention, for achieving the objects described above, there is provided an image emphasis method which is characterized in that; when a sharpness emphasis signal of an image is multiplied by sharpness coefficients, the sharpness of the image is emphasized by multiplying the sharpness coefficients by a function value which is outputted from a look-up table based on the output of an edge detecting filter for detecting only edge portions of the image.

According to another aspect of this invention, there is provided an image sharpness emphasizing apparatus comprising; a line memory which receives a sharp signal of an image to output an unsharp signal and a matrix signal, an edge detecting filter for detecting edges on the image, a multiplication accumulating means which multiplies the matrix signal by the output of the edge detecting filter so as to be accumulated, a subtracting means which calculates a difference signal between the sharp signal and the unsharp signal, a look-up table to be accessed based on the output value of the multiplication accumulating means, a multiplication means for effecting multiplications between the said difference signal, the sharpness coefficients and a function output of the above-mentioned look-up table, and an adder for adding up the sharp signal and the output of the multiplication means so as to be outputted.

The nature, principle and utility of the invention will become more apparent from the following detailed description when read in connection with the accompanying drawings.

BRIEF DESCRIPTION OF THE DRAWINGS

In the accompanying drawings:

FIG. 1 is a flow chart showing an example of the method of invention;

DESCRIPTION OF THE PREFERRED EMBODIMENT

According to this invention, a sharpness emphasis is carried out by multiplying a sharpness emphasis signal of an original image by a function value of a look-up table (edge adjusting table) which is accessed based on the output from an edge detecting filter performing detections in accordance with only the edge portions of the original image.

FIG. 1 shows a flow chart showing a method of the sharpness emphasis according to the present invention. With reference to this flow chart, at first, an original image is read to generate a sharp signal $S_{ij}$ (Step S1). Image data extracted is having a mask size of n×n in which the sharp signal $S_{ij}$ exists as central data (Step S2). This process is followed by the Step S3 generating an edge detection level |E| as well as by the Step S5 generating an unsharp signal u. In the Step S3, the edge detection level |E| is calculated according to formula (1) below:

$$|E| = \left| \sum_{x=i-k}^{i+k} \sum_{y=j-k}^{j+k} (M_{xy} \times S_{xy}) \right| \quad (1)$$

Figures 2A, 2B, 3:
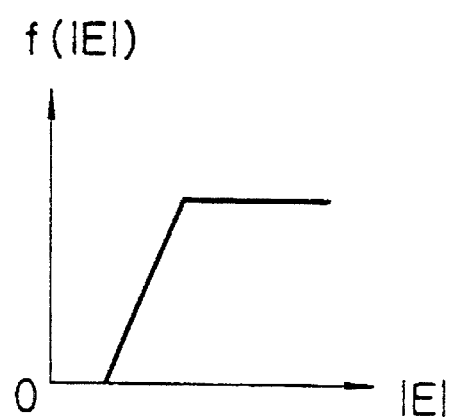
FIGS. 2A and 2B are examples of the edge detection filters used for this invention.
FIG. 3 is a plotted diagram showing an example of a look-up table (edge dependence table) for use in this invention.

In this expression, the constant "k" is k=(n−1)/2 and "Mxy" indicates an edge detecting filter. Here, when the mask size of the unsharp signal u is taken, for example, as 5×5, the matrix for the edge detecting filter Mxy can be considered to be taken as the one shown in FIG. 2A or 2B. It may be possible to make a matrix more weighted. It is also possible, for example to adopt the matrix of FIGS. 2A and 2B as for the matrix of the main scanning direction and for the auxiliary direction, respectively. After the process Step S3 in which the edge detection level |E| is determined, an edge adjusting quantity f(|E|) is determined by using an edge adjusting table f( ) as shown in FIG. 3 (Step S4). The edge detection level (|E|) is determined by using an edge adjusting table f( ) as shown in FIG. 3 (Step S4).

On the other hand, the unsharp signal u is calculated according to the following formula (2) in the Step S5:

$$u = \frac{1}{n \times n} \sum_{x=i-k}^{i+k} \sum_{y=j-k}^{j+k} S_{xy} \quad (2)$$

Subsequently, the difference (Sij-u) between the sharp signal $S_{ij}$ and the unsharp signal u is calculated to produce a sharpness emphasis signal (Step S6). Then, the multiplication of the sharpness emphasis signal $(S_{ij-u})$ by the edge adjusting quantity (f(|E|) is carried out following the expression (3) shown below (Step S7).

$$f(|E|) \cdot (S_{ij}-u) \quad (3)$$

After this process, the harp signal $S_{ij}$ is added to the above result so as to output the sharp signal $S_{ij}'$ being sharpness-emphasized (Step S8). This is shown as the expression (4) below;

$$S_{ij}' = S_{ij} + f(|E|) \cdot (S_{ij}-u) \quad (4)$$

Figure 4:
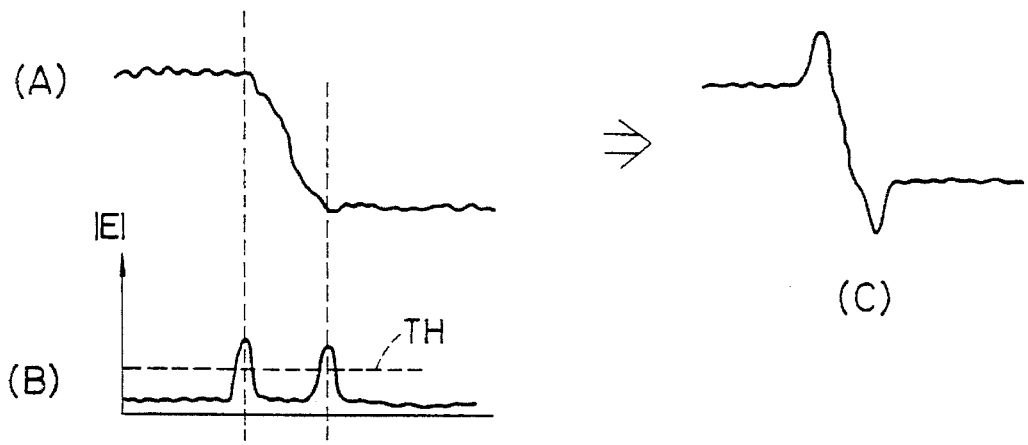
FIG. 4 is a diagram for explaining the operation of this invention.

According to the method for sharpness emphasis of this invention as described above, if a function f(|E|) does not affect any sharpness emphasis as long as the edge detection level |E| is a small value as stored in the edge adjusting table (FIG. 3), the sharpness emphasis is carried out as shown in (C) of FIG. 4 in relation to the sharp signal shown as (A) in FIG. 4. The emphasis is done only when the edge detection level |E| exceeds the threshold TH, as shown in (B) of FIG. 4. That is, only when the edge is surely detected.

Figure 5:
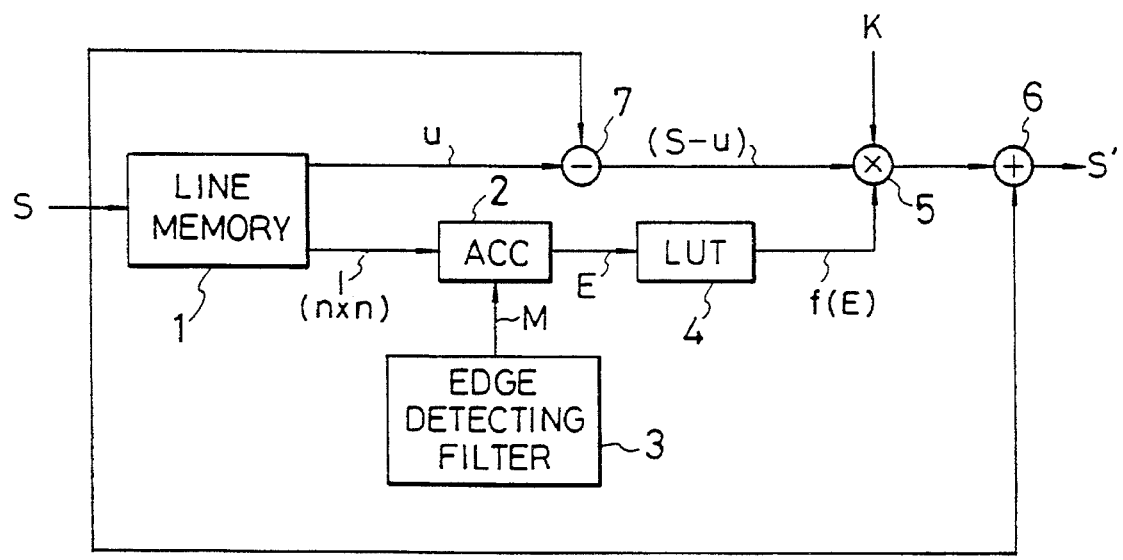
FIG. 5 is a block diagram showing an operational example of the apparatus according to this invention.

FIG. 5 is a block diagram showing an example of the apparatus for the sharpness emphasis according to this invention. A sharpness signal S is stored in a line memory unit 1 as well as input to a subtracter 7 and an adder 6. After the input of the sharp signal S, the line memory unit 1 outputs an unsharp signal u, and at the same time, outputs a sharp signal 1 in the form of the n×n matrix (Step S2). The output M of an edge detecting filter 3 and the sharp signal I, both of which have a form of the matrix like the ones shown in FIGS. 2A and 2B, are input into a multiplication accumulator 2 to be subjected to the multiplication accumulating operation as represented by the formula (1), in order to determine an edge detection level E (Step S3). A look-up table 4, which holds a function as shown in FIG. 3, outputs a function in accordance with the edge detection level E.

While, the unsharp signal u outputted from the line memory unit 1 is input into the subtracter 7, in which the difference (S-u) between the sharp signal S and the unsharp signal u is calculated (Step S6). The obtained result is input into a multiplier 5. The multiplier 5 to which is inputted a sharpness emphasis coefficient K as well as the functional output f(E) of the look-up table 4, performs an operation as shown below:

$$K \cdot (S-u) \cdot f(E) \quad (5)$$

The, the resultant of the above expression (5) is inputted to the adder 6 and added to the sharp signal S to output a sharpness-emphasized sharp signal S' (Step S8)

$$S'=S+K \cdot (S-u) \cdot f(E) \quad (6)$$

Figures 6, 7A, 7B:
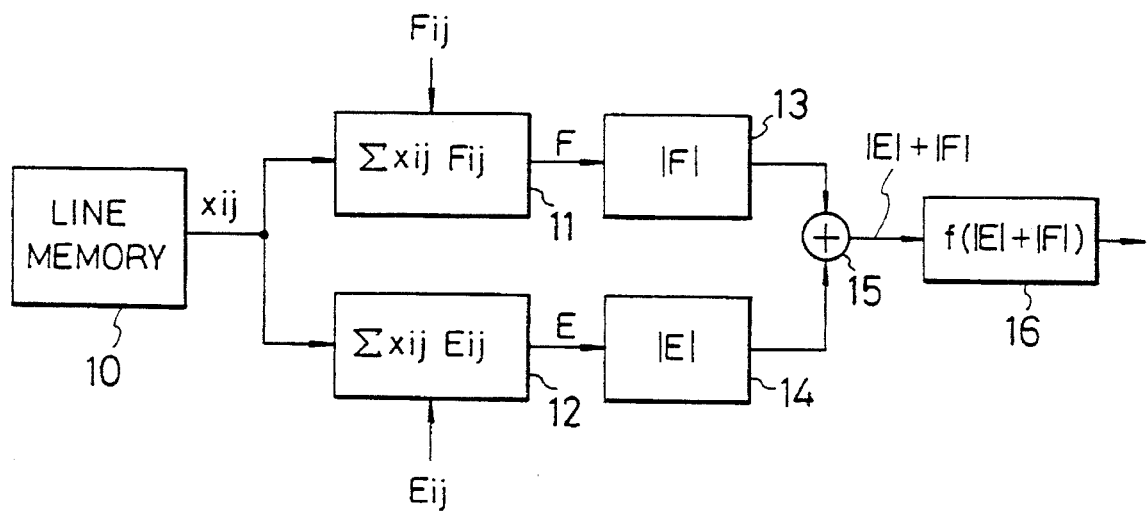
FIG. 6 is a block diagram for partly illustrating another embodiment of this invention.
FIGS. 7A and 7B are diagrams showing respective edge detecting filters for other examples.

In FIG. 6, which shows another example of this invention, a plurality of the edge detecting filters (shown in FIGS. 2A and 2B) are introduced, respectively, for the main scanning direction and the auxiliary scanning direction. A sharp signal $X_{ij}$ of matrix outputted from the line memory 10 is inputted to a multiplication accumulator 11 for main scanning and to a multiplication accumulator 12 for auxiliary scanning. Then the output $F_{ij}$ of the edge detecting filter (FIG. 2A) and the output $E_{ij}$ of the edge detecting filter (FIG. 2B) are respectively input into the multiplication accumulator 11 for the main scanning and the multiplication accumulator 12 for the auxiliary scanning, to output the edge detection level F for the main scanning direction and the edge detection level E for the auxiliary scanning direction to be multiplication-accumulated. The edge detection levels F and E are input into respective absolute value forming circuits 13 and 14 in which the values are transformed to respective absolute values. The resultant absolute value signals |F| and |E| are added in an adder 15 to be input into a look-up table 16. The look-up table 16 holds a function as shown in FIG. 3 to output f(|E|+|F|) in accordance with "|F|+|E|".

Accordingly, since this apparatus detects an edge in accordance with plural directions, i.e., by the main scanning direction and the auxiliary scanning direction, it is possible to perform edge detection more precisely. It should be noted that although the absolute value forming circuit is employed in this configuration, a circuit in which $E^2$, $F^2$ are calculated can also be used in the present invention.

Other examples of the edge detecting filters are shown in FIGS. 7A and 7B, which can be used as an edge detecting filter without weight respectively and another one with weight. Also these edge detecting filters can achieve the edge detections as described above.

According to the sharpness emphasis method and its apparatus of the present invention, since the sharpness emphasis is to be carried out when the edge detection level has a high value, it is possible to avoid emphasizing the grains and the like on the original. In addition, since the size of the mask is variable, and edges are detected from the plural directions, it is possible to effect an optimum sharpness emphasis steadily in accordance only with the edges.

It should be understood that many modifications and adaptations of the invention will become apparent to those skilled in the art and it is intended to encompass such obvious modifications and changes in the scope of the claims appended hereto.

What is claimed is:

1. An image sharpness emphasis apparatus comprising: means for generating a sharp signal which is representative of an image, a line memory output unit, coupled to said generating means, which receives said sharp signal to output an unsharp signal and a matrix signal, an edge detecting filter coupled to said line memory output unit for detecting locations of edges on said image based on said sharp signal, a multiplication accumulating means which multiplies said matrix signal by the output of said edge detecting filter, which represents locations of edges on said image, so as to be accumulated, a subtracting means which calculates a difference signal between said sharp signal and said unsharp signal, a look-up table to be accessed based on the output value of said multiplication accumulating means, a multiplication means for effecting multiplications between said difference signal, a sharpness coefficient and a function output of said look-up table, and an adder for adding up said sharp signal and the output of said multiplication means so as to be outputted.

2. An image sharpness emphasis apparatus as claimed in claim 1, wherein there are provided a plurality of said edge detecting filters and said multiplication accumulating means for the plural directions, and said look-up table is to be accessed by adding up the resultants of the multiplicated accumulation of said each direction.

3. An apparatus for emphasizing sharpness in a picture signal comprising:

(a) picture generating means for generating a picture signal representing an orignal image;

(b) a memory and output device coupled to said picture generating means for storing said picture signal, and for outputting a matrix signal, having said picture signal as central data, and an unsharp signal, having peripheral data of said picture signal;

(c) detecting means for detecting edge levels of said matrix signal;

(d) weighting means for weighting detected edges and for generating a weighting signal from a function stored in a look-up table, said weighting signal being generated in accordance with said detected edge level; and (e) emphasizing means for emphasizing sharpness in said picture signal in accordance with said weighted signal and said unsharp signal.

4. The apparatus for emphasizing sharpness in claim 3, wherein said detecting means further comprises a plurality of edge detecting filters for detecting said edges of said matrix signal for different scanning directions and accumulating means for respectively multiplying and accumulating said matrix signal with said edge detecting filters so as to thereby generate a plurality of edge level signal of said matrix signal.

5. The apparatus for emphasizing sharpness in claim 3, wherein said detecting means comprises a plurality of filters each for detecting an edge of said picture signal in a different scanning direction.

6. The apparatus for emphasizing sharpness in claim 3, wherein said picture signal is a pixel of said original image, said matrix signal is an N by N matrix having said pixel as a central point, and said unsharp signal is an average value of an N by N matrix containing pixels of said original image that surround said picture signal.

7. The apparatus for emphasizing sharpness recited in claim 3, wherein said emphasizing means further comprises:

subtracting means for producing a difference signal representative of a difference between said picture signal and said unsharp signal;

multiplication means for producing a product signal representative of a product of said difference signal and weighted signal;

adder means for producing an addition signal representative of an addition of said picture signal and said product signal.

* * * * *